United States Patent
Goldstein et al.

(10) Patent No.: US 10,223,467 B2
(45) Date of Patent: Mar. 5, 2019

(54) SEARCH CRITERION DISAMBIGUATION AND NOTIFICATION

(71) Applicant: Hipmunk, Inc., San Francisco, CA (US)

(72) Inventors: Adam Julian Goldstein, San Francisco, CA (US); Navin Lal, San Francisco, CA (US); Zak Lee, San Francisco, CA (US); Richard Shaffer, San Francisco, CA (US); Zohaib Ahmed, San Francisco, CA (US)

(73) Assignee: Hipmunk, Inc., San Francisco, CA (US)

( * ) Notice: Subject to any disclaimer, the term of this patent is extended or adjusted under 35 U.S.C. 154(b) by 0 days.

(21) Appl. No.: 15/604,123

(22) Filed: May 24, 2017

(65) Prior Publication Data

US 2017/0344566 A1    Nov. 30, 2017

Related U.S. Application Data

(60) Provisional application No. 62/342,521, filed on May 27, 2016.

(51) Int. Cl.
*G06F 7/00* (2006.01)
*G06F 17/00* (2006.01)
(Continued)

(52) U.S. Cl.
CPC ........ *G06F 17/3087* (2013.01); *G06F 17/278* (2013.01); *G06F 17/30867* (2013.01); *G06F 17/30991* (2013.01); *G06F 17/30241* (2013.01)

(58) Field of Classification Search
None
See application file for complete search history.

(56) References Cited

U.S. PATENT DOCUMENTS 8,122,016 B1 * 2/2012 Lamba ............... G06F 17/30976
                                            707/723
9,341,490 B1 * 5/2016 Carter ................. G01C 21/3611
(Continued)

FOREIGN PATENT DOCUMENTS

WO    2017205793    11/2017

OTHER PUBLICATIONS

"International Application Serial No. PCT/US2017/034767, International Search Report dated Aug. 24, 2017", 2 pgs.
(Continued)

*Primary Examiner* — Tuan A Pham
(74) *Attorney, Agent, or Firm* — Schwegman Lundberg & Woessner, P.A.

(57) ABSTRACT

A machine is configured to perform an example method that causes the machine to parse sub-phrases within a phrase, recognize that a sub-phrase has or can have a geographically specific meaning, and notify a user that the sub-phrase is being processed using the geographically specific meaning. For example, supposing a user has communicated a phrase, the machine builds sub-phrases from the n-grams of the phrase and detects that an n-gram has a geographically specific meaning, thus disambiguating the n-gram. This disambiguation is performed using one or more geographically specific databases of n-grams. The machine determines that a geographical location is relevant to the n-gram, selects a specialized search procedure for the n-gram, and obtains search results using the selected specialized search procedure. The machine may also notify the user that the n-gram or a sub-phrase in which the n-gram appears is being processed using the geographically specific meaning.

13 Claims, 6 Drawing Sheets

(51) Int. Cl.
*G06F 17/30* (2006.01)
*G06F 17/27* (2006.01)

(56) References Cited

U.S. PATENT DOCUMENTS

| | | | |
|---|---|---|---|
| 2007/0136251 A1* | 6/2007 | Colledge | G06F 17/3064 |
| 2013/0031113 A1* | 1/2013 | Feng | G06F 17/30401 |
| | | | 707/755 |
| 2014/0207748 A1* | 7/2014 | Sood | G06F 17/3097 |
| | | | 707/706 |
| 2014/0279078 A1* | 9/2014 | Nukala | G06Q 30/0243 |
| | | | 705/14.73 |
| 2016/0004766 A1* | 1/2016 | Danielyan | G06F 17/2785 |
| | | | 707/723 |
| 2016/0092434 A1 | 3/2016 | Bellegarda | |

OTHER PUBLICATIONS

"International Application Serial No. PCT/US2017/034767, Written Opinion dated Aug. 24, 2017", 5 pgs.
"International Application Serial No. PCT US2017 034767, International Preliminary Report on Patentablity dated Sep. 19, 2018", 10 pgs.
"International Application Serial No. PCT US2017 034767, Response to Written Opinion filed Mar. 6, 2018", 5 pgs.

* cited by examiner

SEARCH CRITERION DISAMBIGUATION AND NOTIFICATION

RELATED APPLICATION

This application claims the priority benefit of U.S. Provisional Patent Application No. 62/342,521, filed May 27, 2016, which is incorporated herein by reference in its entirety.

TECHNICAL FIELD

The subject matter disclosed herein generally relates to the technical field of special-purpose machines that facilitate interactions with search engines, including software-configured computerized variants of such special-purpose machines and improvements to such variants, and to the technologies by which such special-purpose machines become improved compared to other special-purpose machines that facilitate interactions with search engines. Specifically, the present disclosure addresses systems and methods to facilitate search criterion disambiguation and notification.

BACKGROUND

A machine may be configured to interact with one or more users by receiving searches and providing search results. For example, a machine in the example form of a search engine (e.g., a server machine configured to provide database searching services over a network to one or more users via client devices) may be configured to accept a submission of search criteria from a user's device, use the submitted search criteria to retrieve search results, and provide the search results to the user's device.

BRIEF DESCRIPTION OF THE DRAWINGS

Some embodiments are illustrated by way of example and not limitation in the figures of the accompanying drawings.

DETAILED DESCRIPTION

Figure 1:
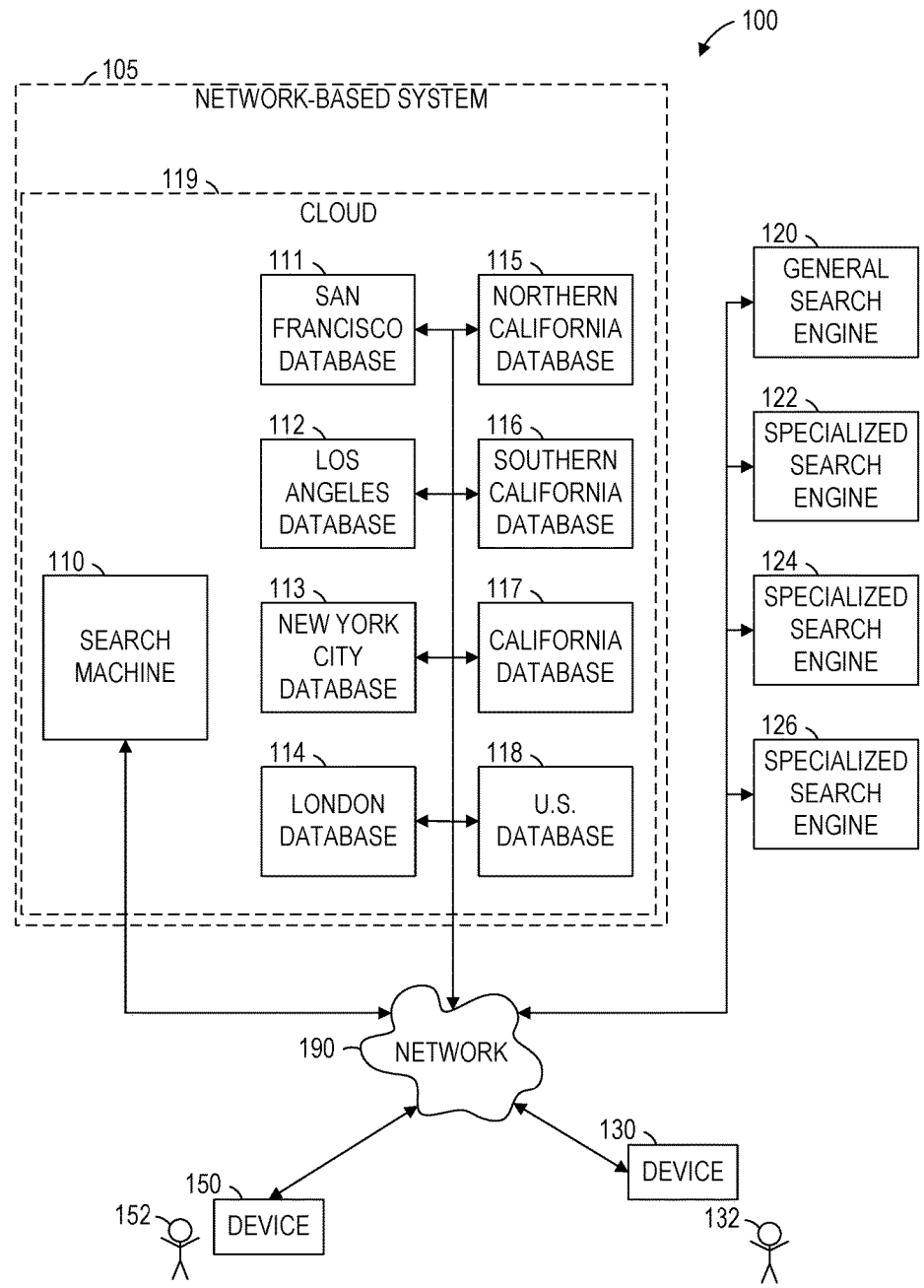
FIG. 1 is a network diagram illustrating a network environment suitable for search criterion disambiguation and notification, according to some example embodiments.

Example methods (e.g., algorithms) facilitate disambiguation of a search criterion, providing one or more users with notification thereof, or both, and example systems (e.g., special-purpose machines configured by special-purpose software) are configured to facilitate disambiguation of a search criterion, providing one or more users with notification thereof, or both. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., a search machine) is configured (e.g., by modules of hardware, software, or both) to perform an example method that causes the machine to parse and recognize various portions (e.g., sub-phrases) within a search phrase or other phrase communicated by a user, recognize that a portion (e.g., sub-phrase) has or can have a geographically specific meaning (e.g., due to a geographically localized semantic context), and notify the user that the portion of the phrase is being processed (e.g., searched or analyzed) using the geographically specific meaning. In an example scenario, a user has communicated the phrase, "I want a hotel with free Wi-Fi near Pluto" (e.g., by submitting typed text or speaking a voice command into a search interface or into a machine-monitored message conversation). The machine parses (e.g., deconstructs) the communicated phrase into its constituent n-grams, such as "hotel," "free," "Wi-Fi," "near," and "Pluto." The machine then generates (e.g., builds, using semantic analysis of the n-grams) a set of different sub-phrases (e.g., noun phrases or other clauses) from the n-grams, and may process each of the different sub-phrases differently in gathering search results for each of the different sub-phrases (e.g., allocate each sub-phrase to a corresponding data source to be searched using that sub-phrase). For example, the machine (e.g., using semantic analysis) may generate the sub-phrases "free Wi-Fi" and "near Pluto."

The machine also detects a geographical location of the user (e.g., via global positioning system (GPS) coordinates or a network address of the user's device), and the user's detected location is used by the machine to disambiguate one or more n-grams or the one or more sub-phrases in which the n-grams appear. This disambiguation is performed using one or more geographically specific databases (e.g., tables, lists, or other databases) of n-grams.

In the above example scenario, the n-gram "Pluto" has a special geographically specific meaning in San Francisco, where "Pluto" is the name of a popular San Francisco restaurant and has a likelihood (e.g., higher than an average or otherwise representative statewide, regional, or national likelihood) of referring to the restaurant (e.g., as opposed to the planet of the same name or the cartoon character of the same name), while in other cities "Pluto" has no special meaning and is more likely to refer to the planet Pluto or the Disney® cartoon character named "Pluto." The machine disambiguates the n-gram "Pluto" using the user's detected location and one or more geographically specific databases (e.g., relational databases, tables, or lists that correspond to a specific geographical area).

Each geographical area at any scale (e.g., address, neighborhood, postal code, city, county, region, state, time zone, country, or continent) may have its own geographically specific database (e.g., a relational database, a table, or a list of n-grams). Moreover, geographically specific databases may overlap in their respectively corresponding geographical areas. For example, a database for San Francisco may overlap with (e.g., be or include a subset of) a database for Northern California; the database for Northern California may be a subset of a database for the entirety of California; and the database for the entirety of California may intersect with a database for the American Southwest region. The geographically specific databases may also overlap in their contents (e.g., n-grams). For example, geographically specific databases for San Francisco and Los Angeles may share several n-grams in common, but these shared n-grams may be absent from a geographically specific database for New York City.

Continuing the above example scenario, in one example implementation, a database for San Francisco may include the n-gram "Pluto" and may associate that n-gram with the n-gram "restaurant" (e.g., along with one or more additional descriptors of the restaurant named "Pluto," such as its address, phone number, reviews, ratings, or other descriptive information). Accordingly, if the user is located in or near (e.g., within a threshold maximum distance from the center or a border of) San Francisco, the machine may treat the sub-phrase "hotel near Pluto" as referencing one or more hotels near the restaurant. As a consequence, the sub-phrase "hotel near Pluto" may be included in a specialized search (e.g., requested by the machine) of a specialized search engine, such as a restaurant search engine or other point-of-interest (POI) search engine. For example, a restaurant search engine (e.g., as described by metadata) may be selected by the machine in response to the n-gram "restaurant" being associated with the n-gram "Pluto" by the database for San Francisco. Alternatively, if the user is located outside San Francisco (e.g., beyond the threshold maximum distance), and if no other geographically specific database is applicable to the n-gram "Pluto" for the user's location, the machine may treat the sub-phrase "hotel near Pluto" as either having no meaning (e.g., to be omitted from search criteria or otherwise left unsearched) or having a general meaning that is independent of location (e.g., to be included in a general search to be requested from a general search engine, such as Google® or Bing®).

In another example implementation, the database for San Francisco may associate the n-gram "Pluto" with a specific specialized search engine (e.g., a restaurant search engine or other POI search engine) to be searched when a sub-phrase includes the n-gram "Pluto." Hence, if the user is located in or near San Francisco, the machine may submit the sub-phrase "hotel near Pluto" to the specific specialized search engine, based on the association relationship between the specific specialized search engine and the n-gram "Pluto" in the database for San Francisco. Alternatively, if the user is located outside San Francisco, and if no other geographically specific database is applicable to the n-gram "Pluto" for the user's location, the machine may submit the sub-phrase "hotel near Pluto" to a general search engine (e.g., based on a lack of any association relationship between the n-gram "Pluto" and any specific specialized search engine).

In a further example implementation, the database for San Francisco may store only n-grams that are specific to San Francisco, without associating the n-grams with any additional information other than linking the n-grams to the city of San Francisco. In such a case, if the user is located in or near San Francisco, the machine may detect that the n-gram "Pluto" is contained in the database for San Francisco (e.g., as described by metadata) and consequently incorporate (e.g., add) the n-gram "San Francisco" into the sub-phrase "hotel near Pluto" to obtain the modified sub-phrase "hotel near Pluto San Francisco," "hotel near San Francisco Pluto," or "San Francisco hotel near Pluto." The machine may then submit the modified sub-phrase to a general search engine. Alternatively, if the user is located outside San Francisco, and if no other geographically specific database is applicable to the n-gram "Pluto" for the user's location, the machine may either omit the sub-phrase "hotel near Pluto" from search criteria to be submitted to the general search engine or include the sub-phrase "hotel near Pluto" in the search criteria without modification.

In addition, the machine may notify the user (e.g., via the user's device) regarding how the disambiguated n-gram "Pluto" is being processed by the machine. For example, the machine may generate a notification that the sub-phrase "near Pluto" has triggered a search of a specialized search engine (e.g., a restaurant search engine) due to the user being located in or near San Francisco. As another example, the machine may generate a notification that the sub-phrase "near Pluto" has been omitted (e.g., ignored) or has triggered a search of a general search engine (e.g., Google®) due to the user being located outside San Francisco. Accordingly, the machine may control a device of the user by causing the device to display or otherwise present the generated notification (e.g., within an alert, a pop-up widget, or another communication to the user).

FIG. 1 is a network diagram illustrating a network environment 100 suitable for search criterion disambiguation and notification, according to some example embodiments. The network environment 100 includes a search machine 110 (e.g., a search server machine or a search modification machine) and devices 130 and 150 (e.g., user devices), all communicatively coupled to each other via a network 190. The network environment 100 also includes a set of one or more databases 111, 112, 113, 114, 115, 116, 117, and 118 (e.g., geographically specific databases), and each one corresponds to a different geographical area (e.g., San Francisco, Los Angeles, New York City, London, Northern California, Southern California, California, and the United States). In addition, the network environment 100 includes a set of one or more search engines 120, 122, 124, and 126. As shown in FIG. 1, the search engine 120 is or includes a general search engine (e.g., a general-purpose search engine, such as Google® or Bing®) or another general database. As used herein, a "general search engine" is a search engine that searches information regarding arbitrary topics (e.g., without topic restrictions other than the search criteria submitted to execute a search).

Each of the search engines 122, 124, and 126 is or includes a different specialized search engine (e.g., a restaurant search engine, a POI search engine, a nightclub search engine, a sports event search engine, or any suitable combination thereof) or other specialized database. As used herein, a "specialized search engine" is a search engine that searches information confined to a set of one or more topics (e.g., with one or more inherent topic restrictions in addition to the search criteria submitted to execute a search).

The search machine 110, with or without any one or more of the databases 111-118 or any one or more of the search engines 120-126, may form all or part of a cloud 119 (e.g., a geographically distributed set of multiple machines configured to function as a single server), which may form all or part of a network-based system 105 (e.g., a cloud-based server system configured to provide one or more network-based services to the devices 130 and 150). In some implementations, one or more of the databases 111-118 may form all or part of a larger single database (e.g., be portions or subsets of the larger single database). In various implementations, an entity that maintains and operates the search machine 110 may also maintain and operate one or more of the databases 111-118, one or more of the search engines 120-126, or any suitable combination thereof. The search machine 110, the databases 111-118, the search engines 120-126, and the devices 130 and 150 may each be implemented in a special-purpose (e.g., specialized) computer system, in whole or in part, as described below with respect to FIG. 6.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the search machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
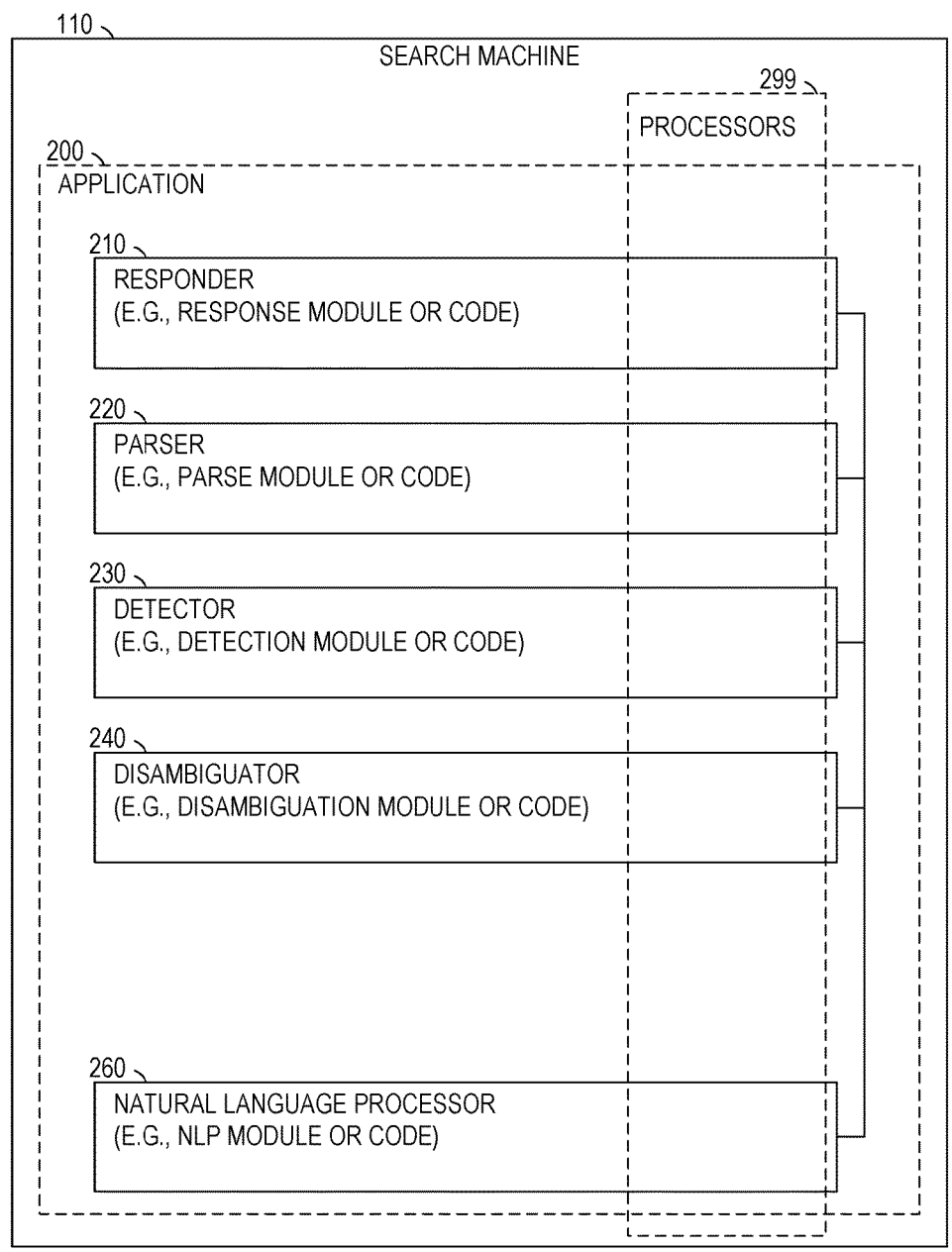
FIG. 2 is a block diagram illustrating components of a search machine suitable for search criterion disambiguation and notification, according to some example embodiments.

FIG. 2 is a block diagram illustrating components of the search machine 110, according to some example embodiments. The search machine 110 is shown as including a responder 210 (e.g., a response module or response code), a parser 220 (e.g., a parse module or parsing code), a detector 230 (e.g., a detection module or detection code), a disambiguator 240 (e.g., a disambiguation module or disambiguation code), and a natural language processor 260 (e.g., a natural language processing (NLP) module or NLP code), all configured to communicate with each other (e.g., via a bus, shared memory, or a switch).

The natural language processor 260 is configured in accordance with one or more NLP algorithms (e.g., configured to execute the one or more NLP algorithms). According to various example embodiments, the responder 210, the parser 220, the detector 230, the disambiguator 240, or any suitable combination thereof is configured to invoke (e.g., execute, request, command, or otherwise initiate) one or more of the NLP algorithms supported by the natural language processor 260. In some example embodiments, the natural language processor 260 provides an application programming interface (API) or other programmatic interface to interact with (e.g., provide NLP services to) the responder 210, the parser 220, the detector 230, the disambiguator 240, or any suitable combination thereof.

As shown in FIG. 2, the responder 210, the parser 220, the detector 230, the disambiguator 240, the natural language processor 260, or any suitable combination thereof may form all or part of an application 200 (e.g., a server application, an applet, or a mobile app) that is stored (e.g., installed) on the search machine 110. Furthermore, one or more processors 299 (e.g., hardware processors, digital processors, or any suitable combination thereof) may be included (e.g., temporarily or permanently) in the application 200, the responder 210, the parser 220, the detector 230, the disambiguator 240, the natural language processor 260, or any suitable combination thereof.

In some example embodiments, the application 200 or a portion thereof (e.g., the responder 210, the parser 220, the detector 230, the disambiguator 240, the natural language processor 260, or any suitable combination thereof) is installed on a user device (e.g., device 130 or 150) and executed thereon to cause that user device to perform one or more of the methodologies discussed herein. However, for clarity, the discussion herein focuses on example embodiments in which the application 200 is installed on the search machine 110 and executed thereon to cause the search machine 110 to perform one or more of the methodologies discussed herein.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 3:
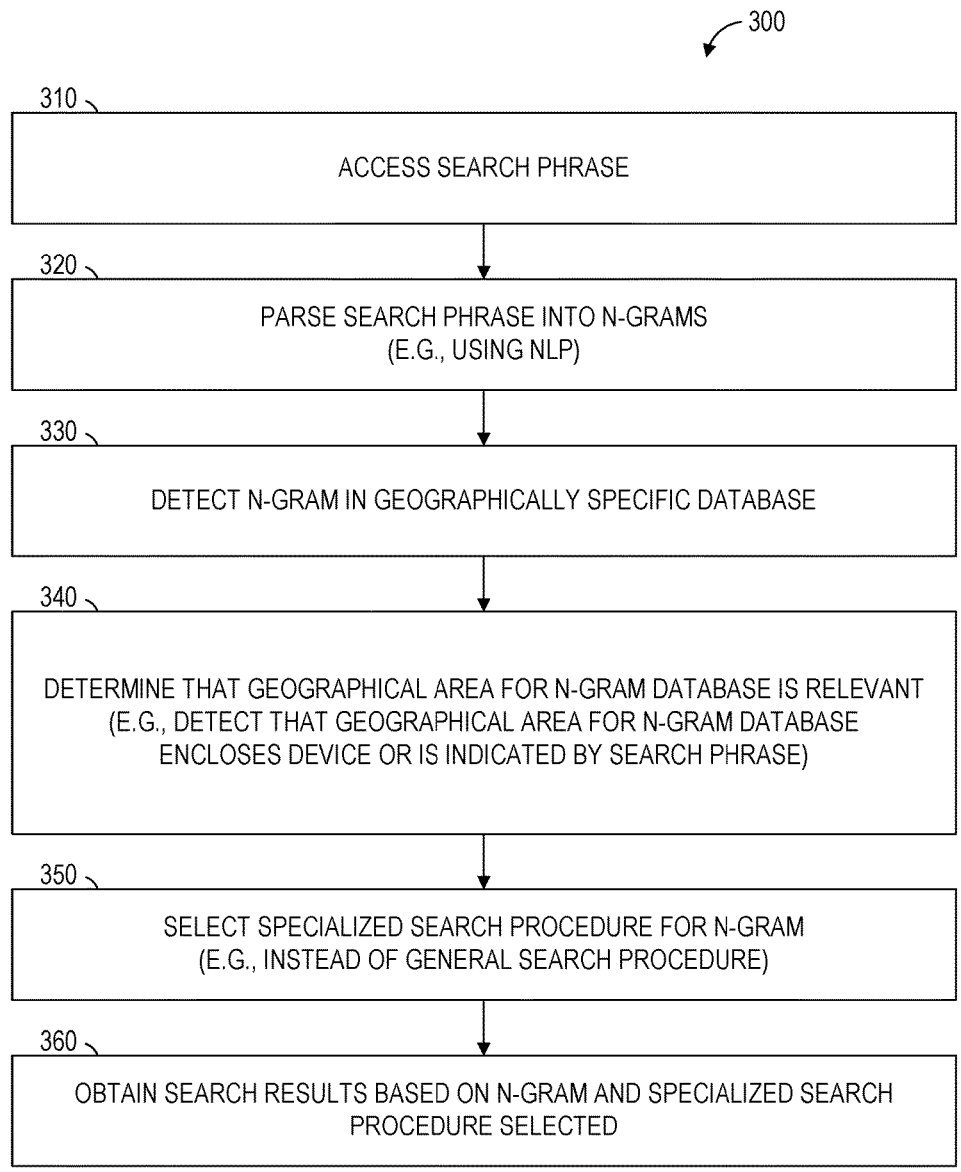
FIGS. 3-5 are flowcharts illustrating operations of the search machine in performing a method of search criterion disambiguation and notification, according to some example embodiments.
Figure 4:
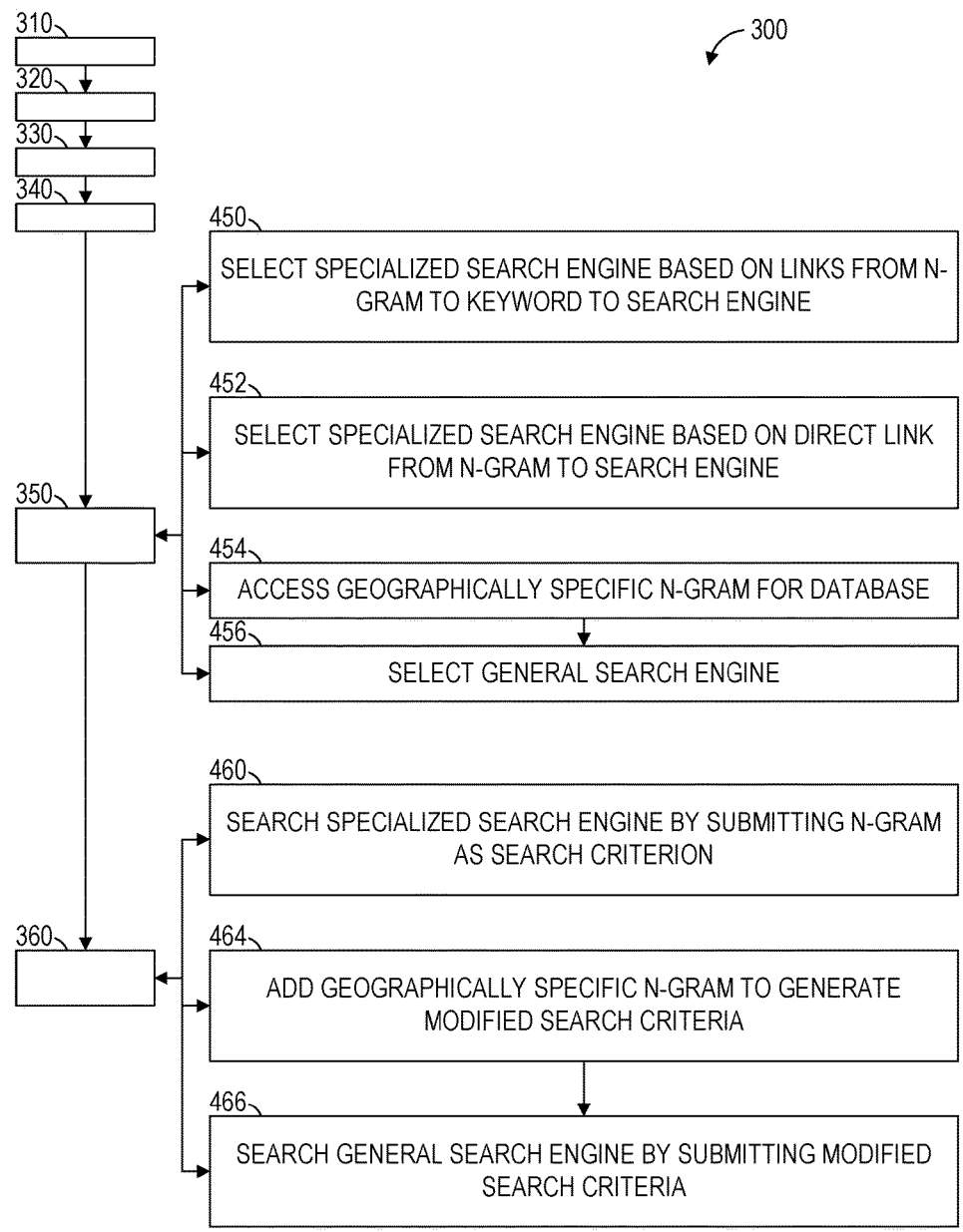
Figure 5:
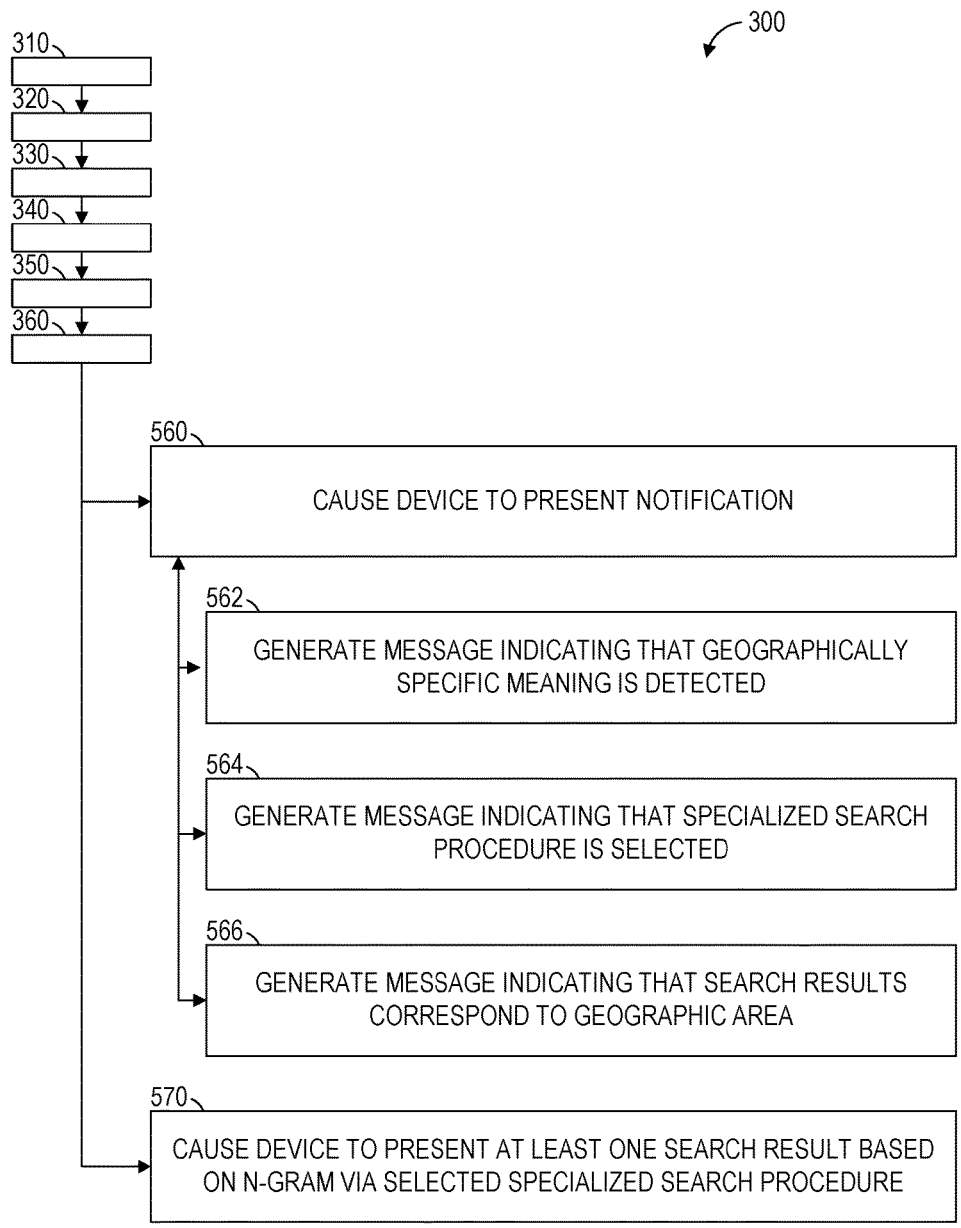

FIGS. 3-5 are flowcharts illustrating operations of the search machine 110 in performing a method 300 of search criterion disambiguation and notification, according to some example embodiments. Operations in the method 300 may be performed by the search machine 110, using components (e.g., modules) described above with respect to FIG. 2, using one or more processors (e.g., microprocessors or other hardware processors), or using any suitable combination thereof. In some example embodiments, similar components or processors are present in a device (e.g., device 130 or 150), and that device (e.g., device 130 or 150) is accordingly configured to perform the method 300. As shown in FIG. 3, the method 300 includes operations 310, 320, 330, 340, 350, and 360.

In operation 310, the responder 210 accesses a phrase (e.g., search phrase) communicated by the user 132. The phrase may be transmitted by the device 130 of the user 132. As noted above, the phrase is or includes one or more n-grams, each of which may function as a search criterion or as search criteria. For example, the responder 210 may access (e.g., receive, retrieve, or read) the phrase "I want a hotel with free Wi-Fi near Pluto." The accessing of this search phrase may be a result of the user 132 submitting the phrase (e.g., via the device 130) as typed text into a text search interface or speaking a voice command (e.g., via the device 130) into a voice search interface. In some example embodiments, the accessing of this phrase is a result of the responder 210 receiving a message in a machine-monitored message conversation (e.g., email conversation, instant message conversation, phone conversation, videoconference, or any suitable combination thereof).

In operation 320, the parser 220 parses (e.g., deconstructs) the phrase into n-grams (e.g., a set of multiple n-grams that collectively constitute the phrase). This may be performed by recognizing, detecting, or otherwise identifying its constituent n-grams (e.g., words or other tokens), which may be recognized, detected, or otherwise identified in between textual spaces (e.g., whitespace characters), punctuation (e.g., punctuation characters), or both within the phrase.

In operation 330, the detector 230 detects that an n-gram (e.g., a first n-gram) among the n-grams of the phrase is represented in an n-gram database (e.g., a first n-gram database, such as the San Francisco database 111) among multiple available n-gram databases (e.g., databases 111-118) that each correspond to a different geographical area (e.g., San Francisco, Los Angeles, New York City, London, Northern California, Southern California, California, and the United States, respectively for the databases 111-118). Any one or more of the available n-gram databases (e.g., databases 111, 112, 113, 114, 115, 116, 117, and 118) may be or include a machine-generated set of data records (e.g., an initial machine-generated set of records) and may be updated (e.g., by a machine or by human input) thereafter. For example, the database 111 (e.g., for San Francisco, with or without one or more surrounding areas) may be machine-generated (e.g., procedurally) from other databases of geographic information (e.g., cities, maps, directories, or POIs). According to some example embodiments, all known n-gram databases (e.g., databases 111-118) are examined during operation 330 (e.g., with or without application of one or more ranking algorithms or other prioritization algorithms).

The database (e.g., database 111) in which the n-gram is detected corresponds to a first geographical area (e.g., San Francisco) among the different geographical areas. For example, the detector 230 may detect that the n-gram (e.g., "Pluto") or an identifier thereof is stored in the database 111 (e.g., San Francisco database) as all or part of a data record therein. The detector 230 may utilize (e.g., via request or command) the natural language processor 260 to detect that the n-gram is represented in the n-gram database. For example, the natural language processor 260 may perform a grammatical analysis of the n-gram (e.g., with or without other n-grams in the phrase, such as adjacent n-grams or non-adjacent n-grams within a predetermined threshold distance within the phrase) and thereby determine whether the n-gram is a noun, a noun modifier, an adjective, or another part of speech. In addition, the natural language processor 260 may perform a semantic analysis of the n-gram (e.g., with or without other n-grams in the phrase) and thereby construct a multi-token n-gram (e.g., "Top of the Mark," which may reference a San Francisco restaurant by that name) that the detector 230 detects in operation 330.

In operation 340, the disambiguator 240 determines that the geographical area that corresponds to the n-gram database is relevant to the phrase accessed in operation 310. According to various example embodiments, this determination is made based on one or more factors. Examples of such factors include the presence of explicit search criteria (e.g., the n-gram "in San Francisco") in the phrase accessed in operation 310, the presence of an identifier of the geographical area (e.g., the n-gram "San Francisco") in previous searches requested from the device 130 (e.g., by the user 132), the presence of the identifier of the geographical area in a travel history of the user 132 (e.g., stored by the device 130 or by the search machine 110), the presence of the identifier of the geographical area in a calendar entry that describes a future event in the calendar of the user 132 (e.g., stored by the device 130 or by the search machine 110), the presence of multiple n-grams from the phrase accessed in operation 310 being represented in the same database (e.g., the n-grams "Golden Gate Bridge" and "Pluto" being within the overall search phrase "a hotel near both the Golden Gate Bridge and Pluto"), and any suitable combination thereof.

In situations where the location of the device 130 is accessible (e.g., by the search machine 110), the disambiguator 240 may determine the relevance of the geographical area of the n-gram database (e.g., database 111) by detecting that the geographical area encloses the device 130 of the user 132 based on location information (e.g., location data) received from the device 130. This may be performed by receiving the location information (e.g., GPS coordinates, a network address, or both) from the device 130 of the user 132 and comparing the location information with one or more boundaries (e.g., polygonal edges) of the geographical area (e.g., San Francisco city limits, with or without one or more surrounding areas) that corresponds to the database (e.g., database 111) in which the n-gram was detected in operation 330. In some example embodiments, the database itself (e.g., database 111) contains metadata that specifies the boundaries of the corresponding geographical area. In alternative example embodiments, such metadata is stored by the search machine 110 (e.g., within the detector 230 or the disambiguator 240). Accordingly, performance of operation 340 may result in a detection that the device 130 is within the geographical area for the database (e.g., database 111).

In certain situations, regardless of whether the location of the device 130 is accessible, the disambiguator 240 may determine that the geographical area of the n-gram database (e.g., database 111) is relevant by detecting that the geographical area is indicated by the phrase accessed in operation 310. This may be performed by invoking a semantic analysis (e.g., by the natural language processor 260) of the n-grams parsed from the phrase in operation 320. For example, supposing that the phrase "I want a San Francisco hotel with free Wi-Fi near Pluto" was accessed in operation 310 and parsed in operation 320, the juxtaposition of the n-gram "San Francisco" within the larger n-gram "San Francisco hotel" may trigger the disambiguator 240 to compare the n-gram "San Francisco" to metadata that specifies the geographical area (e.g., San Francisco city limits, with or without surrounding areas) that corresponds to the database (e.g., database 111) in which the n-gram was detected in operation 330. As noted above, the database (e.g., database 111), the search machine 110 (e.g., the detector 230 or the disambiguator 240), or both may store such metadata. Accordingly, performance of operation 340 may result in a detection that the geographical area for that database (e.g., database 111) is indicated by the phrase accessed in operation 310.

In operation 350, the disambiguator 240 selects a specialized search procedure for the n-gram (e.g., "Pluto") based on (e.g., in response to) the n-gram being represented in the n-gram database (e.g., database 111, which may be a San Francisco database) whose geographical area was determined to be relevant in operation 340. For example, performance of operation 350 may be triggered by a detection that the geographical area for the database 111 encompasses the device 130 of the user 132, triggered by a detection that the geographical area for the database 111 is indicated by the phrase accessed in operation 310, or both. Accordingly, the selection of the specialized search procedure (e.g., among a set of multiple specialized search procedures available for selection) may be performed in response to (e.g., conditioned upon) the contemporaneous (e.g., simultaneous) presence of two conditions: (1) the detection in operation 330 that the n-gram is represented in the database (e.g., database 111), and (2) the detection in operation 340 that the geographical area of that database (e.g., database 111) is relevant to the phrase accessed in operation 310.

The specialized search procedure is distinct from a general search procedure available for selection (e.g., distinct from one or more available general search procedures). In some example embodiments, the search machine 110 may be configured to support a general (e.g., default) search procedure that includes submitting, without modification, an n-gram or a sub-phrase in which the n-gram occurs as a search criterion or as search criteria to a general search engine, such as the general search engine 120 (e.g., Google®, Bing®, or another general-purpose document database). This general search procedure can be contrasted with one or more specialized search procedures that include selecting and using (e.g., searching) a specialized search engine (e.g., specialized search engine 122, which may be a restaurant search engine or other POI search engine) for executing a search thereon based on the n-gram or the sub-phrase. In some example embodiments, one or more of the specialized search procedures include modifying the n-gram or sub-phrase (e.g., by adding one or more additional n-grams) and then selecting and using the general search engine 120 to execute a search thereon based on the modified n-gram or sub-phrase. Further details of operation 350 are discussed below with respect to FIG. 4.

In operation 360, the responder 210 obtains search results based on the n-gram (e.g., "Pluto") and based on (e.g., in accordance with) the specialized search procedure that was selected in operation 350. Further details of operation 360 are discussed below with respect to FIG. 4.

As shown in FIG. 4, in addition to any one or more of the operations previously described, the method 300 may include one or more of operations 450, 452, 454, 456, 460, 464, and 466. One or more of operations 450, 452, 454, and 456 may be performed as part (e.g., a precursor task, a subroutine, or a portion) of operation 350, in which the disambiguator 240 selects the specialized search procedure (e.g., instead of a general search procedure). Furthermore, one or more of operations 460, 464, and 466 may be performed as part of operation 360, in which the responder 210 obtains the search results based on the n-gram (e.g., "Pluto") and based on the specialized search procedure selected in operation 350.

According to some example embodiments, the database (e.g., database 111, which may be a database for a specific geographical area labeled "San Francisco") in which the n-gram was detected in operation 330 stores a data record for the n-gram "Pluto," and the data record associates (e.g., links, assigns, or maps) the n-gram "Pluto" with the n-gram "restaurant" (e.g., along with one or more additional descriptors of the restaurant named "Pluto," such as its address, phone number, reviews, ratings, or other descriptive information). For example, the data record may store the n-gram "Pluto" with the n-gram "restaurant." Accordingly, in selecting the specialized search procedure, the disambiguator 240 may perform operation 450 by selecting a specialized search engine (e.g., specialized search engine 122, 124, or 126, which may be a restaurant search engine), and this selection is based on the association relationship (e.g., a link or other correspondence relationship) between the n-gram "Pluto" and the n-gram "restaurant" (e.g., as part of a chain of association relationships). For example, the specialized search engine 122 may be a restaurant search engine, as described in metadata stored by the specialized search engine 122 or stored by the search machine 110 (e.g., within the disambiguator 240), and the selection of the specialized search engine 122 may be performed based on the n-gram "restaurant" (e.g., functioning as a keyword or other descriptor) matching the metadata that describes the specialized search engine 122 (e.g., metadata that includes the word "restaurant" or the phrase "restaurant search engine" as a descriptor of the specialized search engine 122).

In example embodiments that include operation 450, operation 460 is performed as part of operation 360, in which the responder 210 obtains search results. In operation 460, the responder 210 obtains the search results by searching the specialized search engine (e.g., specialized search engine 122) that was selected in operation 450. For example, the responder 210 may submit the n-gram "Pluto" or a sub-phrase in which the n-gram appears (e.g., "hotel near Pluto") as a search criterion or as search criteria to the specialized search engine 122.

According to certain example embodiments, the database (e.g., database 111) in which the n-gram was detected in operation 330 stores a data record for the n-gram "Pluto," and the data record directly associates the n-gram "Pluto" with the specialized search engine 122 (e.g., a restaurant search engine or other POI search engine). For example, the data record may store the n-gram with an identifier (e.g., a name or a network address) of the specialized search engine 122. Accordingly, in selecting the specialized search procedure, the disambiguator 240 may perform operation 452 by selecting the specialized search engine 122, and this selection is based on the direct association relationship between the n-gram "Pluto" and the specialized search engine 122 (e.g., as a direct link with no intervening links).

In example embodiments that include operation 452, operation 460 is performed as part of operation 360, in which the responder 210 obtains search results. As noted above, in operation 460, the responder 210 obtains the search results by searching the specialized search engine (e.g., specialized search engine 122) that was selected in operation 452. For example, the responder 210 may submit the n-gram "Pluto" or a sub-phrase in which the n-gram appears (e.g., "hotel near Pluto") as a search criterion or as search criteria to the specialized search engine 122.

According to various example embodiments, the database (e.g., database 111) in which the n-gram was detected in operation 330 stores a data record for the n-gram "Pluto," and the data record has no external associations for the n-gram "Pluto." However, in such example embodiments, since the entire database (e.g., database 111) itself is associated with its corresponding geographical area (e.g., San Francisco, with or without one or more surrounding areas), the n-grams represented in the database are also associated with this geographical area. Accordingly, in selecting the specialized search procedure, the disambiguator 240 may perform operations 454 and 456. In operation 454, the disambiguator 240 accesses a geographically specific n-gram (e.g., "San Francisco") that corresponds to the database (e.g., database 111) in which the n-gram "Pluto" was detected. The geographically specific n-gram may be accessed from metadata stored in the database itself (e.g., database 111) or in the search machine 110 (e.g., within the disambiguator 240). In operation 456, the disambiguator 240 selects the general search engine 120 (e.g., among multiple general search engines) as part of selecting the specialized search procedure for the n-gram "Pluto." This may have the effect of fully or partially preparing to submit a modified n-gram or modified sub-phrase to the selected general search engine 120.

In example embodiments that include operations 454 and 456, operations 464 and 466 are performed as part of operation 360, in which the responder 210 obtains search results. In operation 464, the responder 210 generates modified search criteria by adding (e.g., appending or prepending) the geographically specific n-gram (e.g., "San Francisco") accessed in operation 454 to the n-gram (e.g., "Pluto") detected in the database (e.g., database 111) in operation 330. For example, the responder 210 may generate the n-gram "hotel near Pluto San Francisco" as modified search criteria to be submitted to the general search engine 120 that was selected in operation 456. In operation 466, the responder 210 submits the modified search criteria (e.g., the n-gram "hotel near Pluto San Francisco") to the general search engine 120 and initiates a search of the general search engine 120 using the modified search criteria. Even though the general search engine 120 is used to obtain search results, the modification of the search criteria and the submission thereof to the general search engine 120 is considered specialized in this context and therefore is part of the specialized search procedure that was selected in operation 350.

As shown in FIG. 5, in addition to any one or more of the operations previously described, the method 300 may include one or more of operations 560, 562, 564, 566, and 570. In operation 560, the responder 210 causes the device 130 of the user 132 to present a notification that notifies the user 132 regarding how the n-gram "Pluto" is being processed by the search machine 110. In some implementations, the notification highlights or otherwise indicates grammatical parts of speech that were recognized by the detector 230 in operation 330. Accordingly, the responder 210 may fully or partially control the device 130 by causing the device 130 to display or otherwise present the generated notification (e.g., within an alert, a pop-up widget, or another communication to the user 132). One or more of operations 562, 564, and 566 may be performed as part of operation 560.

In operation 562, the responder 210 generates a message (e.g., to be included as part of the notification) indicating that a geographically specific meaning of the n-gram "Pluto" or "near Pluto," or a sub-phrase in which the n-gram appears (e.g., "hotel near Pluto"), has been detected. For example, the message may state or otherwise indicate that the n-gram "Pluto" has a geographically specific meaning within San Francisco (e.g., with or without one or more surrounding areas). This is one way of notifying the user 132 that something semantically special (e.g., beyond a general search procedure or a default search procedure) has been selected for processing this n-gram or sub-phrase.

In operation 564, the responder 210 generates a message (e.g., to be included as part of the notification) indicating that the specialized search procedure has been selected for obtaining search results based on the n-gram. The message may notify the user 132 of one or more reasons for selection of the specialized search procedure (e.g., one or more reasons that the geographical area of the database 111 was determined to be relevant in operation 340). For example, the message may state or otherwise indicate that the n-gram "Pluto" or "near Pluto," or a sub-phrase in which the n-gram appears (e.g., "hotel near Pluto"), has triggered a search of the specialized search engine 122 (e.g., a restaurant search engine) due to the user 132 or the device 130 being located in or near San Francisco (e.g., within the boundaries of the geographical area that corresponds to the database 111). As another example, the message may state or otherwise indicate that the n-gram "Pluto" or "near Pluto," or a sub-phrase in which the n-gram appears (e.g., "hotel near Pluto"), has triggered a search of the specialized search engine 122 (e.g., a restaurant search engine) due to the n-gram "San Francisco" being present within the phrase accessed in operation 310, or due to any one or more of the reasons discussed above with respect to operation 340. Performance of operation 564 therefore is another way of notifying the user 132 that something semantically special (e.g., beyond a general search procedure or a default search procedure) has been selected for processing this n-gram or sub-phrase.

In operation 566, the responder 210 generates a message (e.g., to be included as part of the notification) indicating that the search results obtained in operation 360 correspond to the geographical area that encloses the device 130. For example, the message may state or otherwise indicate that the presence of the device 130 within San Francisco (e.g., with or without surrounding areas) has caused the search results from searching the n-gram "Pluto" or "near Pluto" to include one or more search results associated with San Francisco. This is a further way of notifying the user 132 that something semantically special (e.g., beyond a general search procedure or a default search procedure) has been selected for processing this n-gram or sub-phrase.

In operation 570, the responder 210 causes the device 130 to present at least one of the search results that were obtained in operation 360 (e.g., obtained based on the n-gram "Pluto" in accordance with the specialized search procedure that was selected in operation 350). For example, the responder 210 may combine (e.g., aggregate, synthesize, or otherwise incorporate) multiple sets of partial search results obtained from multiple searches of various search engines or other databases (e.g., one or more of the search engines 122-126). The combined search results can then be processed by the responder 210 for presentation in operation 570. Examples of such processing include filtering (e.g., to obtain a selected subset of the search results), ranking, sorting, highlighting, or arranging the search results. In some example embodiments, the presentation of at least one of the search results includes providing the phrase (e.g., search phrase) accessed in operation 310, with or without highlights. According to various example embodiments, one or more n-grams are highlighted (e.g., emphasized visually, such as with boldface, italics, underlining, or color), including the n-gram detected to be represented in the database 111 in operation 330.

According to various example embodiments, one or more of the methodologies described herein may facilitate n-gram disambiguation, notification thereof, or both. Moreover, one or more of the methodologies described herein may facilitate disambiguation of one or more search criteria, modification of one or more search criteria, selection of an appropriate search engine or other database, notification of such selection to a user, or any suitable combination thereof. Hence, one or more of the methodologies described herein may facilitate faster retrieval of more precise and more accurate search results compared to capabilities of pre-existing systems and methods.

When these effects are considered in aggregate, one or more of the methodologies described herein may obviate a need for certain efforts or resources that otherwise would be involved in such disambiguation of search criteria or other n-grams, notification thereof, or both. Efforts expended by a user in performing these tasks may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 6:
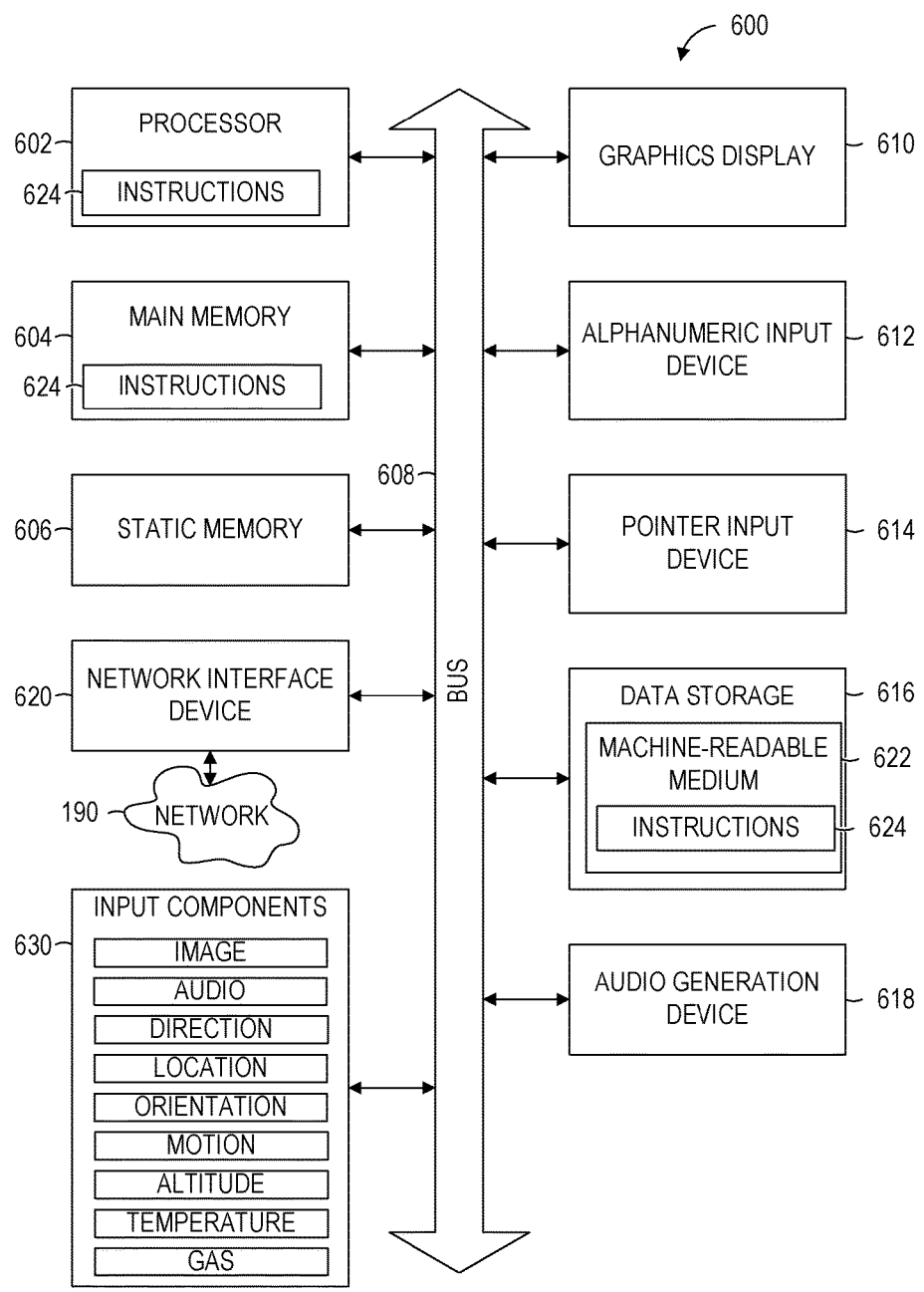
FIG. 6 is a block diagram illustrating components of a machine (e.g., the search machine), according to some example embodiments, able to read instructions from a machine-readable medium and perform any one or more of the methodologies discussed herein.

FIG. 6 is a block diagram illustrating components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer system (e.g., a computer) within which the instructions 624 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be communicatively coupled (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include any collection of machines that individually or jointly execute the instructions 624 to perform all or part of any one or more of the methodologies discussed herein.

The machine 600 includes a processor 602 (e.g., one or more central processing units (CPUs), one or more graphics processing units (GPUs), one or more digital signal processors (DSPs), one or more application-specific integrated circuits (ASICs), one or more radio-frequency integrated circuits (RFICs), or any suitable combination thereof), a main memory 604, and a static memory 606, which are configured to communicate with each other via a bus 608. The processor 602 contains solid-state digital microcircuits (e.g., electronic, optical, or both) that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein. In some example embodiments, the processor 602 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 600 with at least the processor 602, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a pointer input device 614 (e.g., a mouse, a touchpad, a touchscreen, a trackball, a joystick, a stylus, a motion sensor, an eye tracking device, a data glove, or other pointing instrument), a data storage 616, an audio generation device 618 (e.g., a sound card, an amplifier, a speaker, a headphone jack, or any suitable combination thereof), and a network interface device 620.

The data storage 616 (e.g., a data storage device) includes the machine-readable medium 622 (e.g., a tangible and non-transitory machine-readable storage medium) on which are stored the instructions 624 embodying any one or more of the methodologies or functions described herein. The instructions 624 may also reside, completely or at least partially, within the main memory 604, within the static memory 606, within the processor 602 (e.g., within the processor's cache memory), or any suitable combination thereof, before or during execution thereof by the machine 600. Accordingly, the main memory 604, the static memory 606, and the processor 602 may be considered machine-readable media (e.g., tangible and non-transitory machine-readable media). The instructions 624 may be transmitted or received over the network 190 via the network interface device 620. For example, the network interface device 620 may communicate the instructions 624 using any one or more transfer protocols (e.g., hypertext transfer protocol (HTTP)).

In some example embodiments, the machine 600 may be a portable computing device (e.g., a smart phone, a tablet computer, or a wearable device), and may have one or more additional input components 630 (e.g., sensors or gauges). Examples of such input components 630 include an image input component (e.g., one or more cameras), an audio input component (e.g., one or more microphones), a direction input component (e.g., a compass), a location input component (e.g., a GPS receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 624 for execution by the machine 600 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 624).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field-programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an API). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:
by one or more processors of a machine, accessing a search phrase communicated by a user, the search phrase being transmitted by a device of the user and including n-grams;
by one or more processors of the machine, detecting that an n-gram among the n-grams of the search phrase is represented in an n-gram database among multiple n-gram databases that each correspond to a different geographical area, the n-gram database corresponding to a first geographical area among the different geographical areas;
by one or more processors of the machine, detecting that the first geographical area that corresponds to the n-gram database encompasses (e.g., encloses) the device of the user based on location data received from the device;
by one or more processors of the machine, selecting a specialized search procedure for the n-gram based on the n-gram being represented in the n-gram database whose first geographical area encloses the device of the user, the specialized search procedure being distinct from a general search procedure available for selection; and
by one or more processors of the machine, obtaining search results based on the n-gram in accordance with (e.g., by executing) the selected specialized search procedure.

A second embodiment provides a method according to the first embodiment, further comprising:
causing the device to present a notification that a geographically specific meaning of the n-gram in the search phrase has been detected.

A third embodiment provides a method according to the first embodiment or the second embodiment, further comprising:
causing the device to present a notification that the specialized search procedure has been selected for obtaining the search results based on the n-gram.

A fourth embodiment provides a method according to any of the first through third embodiments, further comprising:
causing the device to present a notification that the obtained search results correspond to the first geographical area that encompasses the device.

A fifth embodiment provides a method according to any of the first through fourth embodiments, further comprising:
causing the device to present at least one of the search results obtained based on the n-gram in accordance with (e.g., by executing) the specialized search procedure.

A sixth embodiment provides a method according to any of the first through fifth embodiments, wherein:
the selecting of the specialized search procedure includes selecting a specialized search engine based on the n-gram database that represents the n-gram associating the n-gram with a descriptor of the specialized search engine; and
the executing of the selected specialized search procedure includes submitting the n-gram as a search criterion to the selected specialized search engine.

A seventh embodiment provides a method according to the sixth embodiment, wherein:
the selecting of the specialized search engine includes comparing metadata descriptive of the specialized search engine with the descriptor associated with the n-gram by the n-gram database.

An eighth embodiment provides a method according to any of the first through fifth embodiments, wherein:
the selecting of the specialized search procedure includes selecting a specialized search engine based on the n-gram database that represents the n-gram associating the n-gram with the specialized search engine; and
the executing of the selected specialized search procedure includes submitting the n-gram as a search criterion to the selected specialized search engine.

A ninth embodiment provides a method according to the eighth embodiment, wherein:
the selecting of the specialized search engine includes accessing a data record in the n-gram database, the accessed data record storing the n-gram with an identifier of the specialized search engine.

A tenth embodiment provides a method according to any of the first through fifth embodiments, wherein:
the selecting of the specialized search procedure includes selecting a general search engine based on the n-gram database that represents the n-gram corresponding to the first geographical area among the different geographical areas; and
the executing of the selected specialized search procedure includes submitting generated search criteria that include the n-gram to the selected general search engine.

An eleventh embodiment provides a method according to the tenth embodiment, wherein:
the n-gram represented in the n-gram database is a first n-gram; and
the selecting of the general search engine includes:
accessing a geographically specific second n-gram that corresponds to the n-gram database; and
generating the search criteria to be submitted to the general search engine by combining the first n-gram and the geographically specific second n-gram.

A twelfth embodiment provides a method according to the eleventh embodiment, wherein:
the geographically specific second n-gram is a descriptor of the n-gram database that represents the first n-gram.

A thirteenth embodiment provides a method according to the eleventh embodiment or the twelfth embodiment, wherein:
the geographically specific second n-gram is a descriptor of the first geographical area that corresponds to the n-gram database.

A fourteenth embodiment provides a method according to any of the eleventh through thirteenth embodiments, wherein:
the accessing of the geographically specific second n-gram accesses the geographically specific second n-gram from the n-gram database that represents the first n-gram.

A fifteenth embodiment provides a machine-readable medium (e.g., a non-transitory machine-readable storage medium) comprising instructions that, when executed by one or more processors of a machine, cause the machine to perform operations comprising:
accessing a search phrase communicated by a user, the search phrase including n-grams transmitted by a device of the user;
detecting that an n-gram among the n-grams of the search phrase is represented in an n-gram database among multiple n-gram databases that each correspond to a different geographical area, the n-gram database corresponding to a first geographical area among the different geographical areas;
detecting that the first geographical area that corresponds to the n-gram database encompasses the device of the user based on location data received from the device;
selecting a specialized search procedure for the n-gram based on the n-gram being represented in the n-gram database whose first geographical area encompasses the device of the user, the specialized search procedure being distinct from a general search procedure available for selection; and
obtaining search results based on the n-gram by executing the selected specialized search procedure.

A sixteenth embodiment provides a machine-readable medium according to the fifteenth embodiment, wherein the operations further comprise:
causing the device to present a notification that the obtained search results correspond to the first geographical area that encompasses the device.

A seventeenth embodiment provides a machine-readable medium according to the fifteenth embodiment or the sixteenth embodiment, wherein:
the selecting of the specialized search procedure includes selecting a specialized search engine based on the n-gram database that represents the n-gram associating the n-gram with a descriptor of the specialized search engine; and
the executing of the selected specialized search procedure includes submitting the n-gram as a search criterion to the selected specialized search engine.

An eighteenth embodiment provides a system (e.g., a computer system) comprising:
one or more processors; and
a memory storing instructions that, when executed by at least one processor among the one or more processors, cause the system to perform operations comprising:

accessing a search phrase communicated by a user, the search phrase including n-grams transmitted by a device of the user;

detecting that an n-gram among the n-grams of the search phrase is represented in an n-gram database among multiple n-gram databases that each correspond to a different geographical area, the n-gram database corresponding to a first geographical area among the different geographical areas;

detecting that the first geographical area that corresponds to the n-gram database encompasses the device of the user based on location data received from the device;

selecting a specialized search procedure for the n-gram based on the n-gram being represented in the n-gram database whose first geographical area encompasses the device of the user, the specialized search procedure being distinct from a general search procedure available for selection; and obtaining search results based on the n-gram by executing the selected specialized search procedure.

A nineteenth embodiment provides a system according to the eighteenth embodiment, wherein the operations further comprise:

causing the device to present at least one of the search results obtained based on the n-gram by executing the specialized search procedure.

A twentieth embodiment provides a system according to the eighteenth embodiment or the nineteenth embodiment, wherein:

the selecting of the specialized search procedure includes selecting a specialized search engine based on the n-gram database that represents the n-gram associating the n-gram with a descriptor of the specialized search engine; and the executing of the selected specialized search procedure includes submitting the n-gram as a search criterion to the selected specialized search engine.

A twenty-first embodiment provides a carrier medium carrying machine-readable instructions for controlling a machine to carry out the method of any one of the first through fourteenth embodiments.

What is claimed is:

1. A method comprising:
    accessing, by one or more processors of a machine, a search phrase that includes n-grams transmitted by a device;
    detecting, by one or more processors of the machine, that a first n-gram among the n-grams of the search phrase is represented in a data record within an n-gram database among multiple n-gram databases that each correspond to a different geographical area, the n-gram database storing metadata that specifies boundaries of a corresponding geographical area among the different geographical areas, the data record within the n-gram database associating the detected first n-gram with a second n-gram that describes the detected first n-gram;
    detecting, by one or more processors of the machine, that the geographical area whose boundaries are specified by the metadata in the n-gram database encompasses the device based on location data received from the device;
    modifying, by one or more processors of the machine, the accessed search phrase by adding the second n-gram that describes the first n-gram to the accessed search phrase based on the first n-gram being represented in the n-gram database that stores the metadata that specifies the boundaries of the geographical area that encompasses the device; and
    obtaining, by one or more processors of the machine, search results based on the modified search phrase that includes the second n-gram that describes the first n-gram, the obtaining of the search results including:
        selecting a specialized search engine based on the n-gram database associating the first n-gram with a descriptor of the specialized search engine, the selecting of the specialized search engine including comparing further metadata descriptive of the specialized search engine with the descriptor associated with the first n-gram; and
        submitting the first n-gram as a search criterion to the selected specialized search engine.

2. The method of claim 1, further comprising:
causing the device to present a notification that a geographically specific meaning of the first n-gram in the search phrase has been detected.

3. The method of claim 1, further comprising:
causing the device to present a notification that a specialized search procedure has been selected for obtaining the search results based on the first n-gram.

4. The method of claim 1, further comprising:
causing the device to present a notification that the obtained search results correspond to the geographical area that encompasses the device.

5. The method of claim 1, further comprising:
causing the device to present at least one of the search results obtained based on the modified search phrase that includes the second n-gram that describes the first n-gram.

6. The method of claim 1, wherein:
the obtaining of the search results further includes:
selecting a further specialized search engine based on the n-gram database associating a further n-gram among the n-grams of the search phrase with the specialized search engine; and
submitting the first n-gram as a search criterion to the selected specialized search engine.

7. The method of claim 6, wherein:
the selecting of the further specialized search engine includes accessing the data record in the n-gram database, the accessed data record storing the further n-gram with an identifier of the further specialized search engine.

8. The method of claim 1, wherein:
the obtaining of the search results further includes:
selecting a general search engine based on the n-gram database corresponding to the geographical area among the different geographical areas; and
submitting generated search criteria that include the first n-gram to the selected general search engine.

9. The method of claim 8, wherein:
the selecting of the general search engine includes:
    accessing the second n-gram from the data record within the n-gram database; and
    generating the search criteria to be submitted to the general search engine by combining the first n-gram and the second n-gram.

10. A non-transitory machine-readable storage medium comprising instructions that, when executed by one or more processors of a machine, cause the machine to perform operations comprising:
    accessing a search phrase that includes n-grams transmitted by a device;
    detecting that a first n-gram among the n-grams of the search phrase is represented in a data record within an n-gram database among multiple n-gram databases that each correspond to a different geographical area, the n-gram database storing metadata that specifies boundaries of a corresponding geographical area among the different geographical areas, the data record within the n-gram database associating the detected first n-gram with a second n-gram that describes the detected first n-gram;

detecting that the geographical area whose boundaries are specified by the metadata in the n-gram database encompasses the device based on location data received from the device;

modifying the accessed search phrase by adding the second n-gram that describes the first n-gram to the accessed search phrase based on the first n-gram being represented in the n-gram database that stores the metadata that specifies the boundaries of the geographical area that encompasses the device; and obtaining search results based on the modified search phrase that includes the second n-gram that describes the first n-gram, the obtaining of the search results including:

selecting a specialized search engine based on the n-gram database associating the first n-gram with a descriptor of the specialized search engine, the selecting of the specialized search engine including comparing further metadata descriptive of the specialized search engine with the descriptor associated with the first n-gram; and submitting the first n-gram as a search criterion to the selected specialized search engine.

11. The non-transitory machine-readable storage medium of claim 10, wherein the operations further comprise:

causing the device to present a notification that the obtained search results correspond to the geographical area that encompasses the device.

12. A system comprising:

one or more processors; and a memory storing instructions that, when executed by at least one processor among the one or more processors, cause the system to perform operations comprising:

accessing a search phrase that includes n-grams transmitted by a device;

detecting that a first n-gram among the n-grams of the search phrase is represented in a data record within an n-gram database among multiple n-gram databases that each correspond to a different geographical area, the n-gram database storing metadata that specifies boundaries of a corresponding geographical area among the different geographical areas, the data record within the n-gram database associating the detected first n-gram with a second n-gram that describes the detected first n-gram;

detecting that the geographical area whose boundaries are specified by the metadata in the n-gram database encompasses the device based on location data received from the device;

modifying the accessed search phrase by adding the second n-gram that describes the first n-gram to the accessed search phrase based on the first n-gram being represented in the n-gram database that stores the metadata that specifies the boundaries of the geographical area that encompasses the device; and obtaining search results based on the modified search phrase that includes the second n-gram that describes the first n-gram, the obtaining of the search results including:

selecting a specialized search engine based on the n-gram database associating the first n-gram with a descriptor of the specialized search engine, the selecting of the specialized search engine including comparing further metadata descriptive of the specialized search engine with the descriptor associated with the first n-gram; and submitting the first n-gram as a search criterion to the selected specialized search engine.

13. The system of claim 12, wherein the operations further comprise:

causing the device to present at least one of the search results obtained based on the modified search phrase that includes the second n-gram that describes the first n-gram.

* * * * *